US011136961B2

(12) United States Patent
Vadlamudi et al.

(10) Patent No.: US 11,136,961 B2
(45) Date of Patent: Oct. 5, 2021

(54) SYSTEM AND METHOD FOR OPTIMIZING POWER OUTPUT OF A WIND TURBINE DURING AN OPERATIONAL CONSTRAINT

(71) Applicant: General Electric Company, Schenectady, NY (US)

(72) Inventors: Venkata Krishna Vadlamudi, Bangalore (IN); Bernardo Adrian Movsichoff, Simpsonville, SC (US); Akshay Ambekar, Bangalore (IN); Arne Koerber, Berlin (DE)

(73) Assignee: General Electric Company, Schenectady, NY (US)

( * ) Notice: Subject to any disclaimer, the term of this patent is extended or adjusted under 35 U.S.C. 154(b) by 724 days.

(21) Appl. No.: 15/611,159

(22) Filed: Jun. 1, 2017

(65) Prior Publication Data

US 2018/0347543 A1 Dec. 6, 2018

(51) Int. Cl.
*F03D 7/02* (2006.01)
*F03D 7/04* (2006.01)

(52) U.S. Cl.
CPC .......... *F03D 7/0276* (2013.01); *F03D 7/042* (2013.01); *F03D 7/045* (2013.01); *F03D 7/024* (2013.01); *F03D 7/0224* (2013.01); *F03D 7/0296* (2013.01); *F03D 7/044* (2013.01); *F05B 2270/101* (2013.01); *F05B 2270/20* (2013.01); *F05B 2270/30* (2013.01); *F05B 2270/32* (2013.01); *F05B 2270/327* (2013.01); *F05B 2270/328* (2013.01); *F05B 2270/331* (2013.01); *F05B 2270/332* (2013.01); *F05B 2270/333* (2013.01)

(58) Field of Classification Search
CPC ...... F03D 7/0224; F03D 7/024; F03D 7/0276; F03D 7/028; F03D 7/042; F03D 7/044; F03D 7/045; F03D 7/0296; F05B 2270/20; F05B 2270/101; F05B 2270/30; F05B 2270/32; F05B 2270/328; F05B 2270/331; F05B 2270/332; F05B 2270/333; F05B 2270/335
See application file for complete search history.

(56) References Cited

U.S. PATENT DOCUMENTS

| 7,763,989 | B2 | 7/2010 | Kinzie et al. |
| 8,803,352 | B1 | 8/2014 | Koerber et al. |

(Continued)

FOREIGN PATENT DOCUMENTS

| EP | 2273105 A2 | 1/2011 |
| EP | 2522853 A2 | 11/2012 |

OTHER PUBLICATIONS

International Search Report, dated Aug. 29, 2018, for Application No. PCT/US2018/32245.

(Continued)

*Primary Examiner* — Christopher Verdier
(74) *Attorney, Agent, or Firm* — Dority & Manning, P.A.

(57) ABSTRACT

A method for optimizing power production of a wind turbine includes determining at least one operational constraint for the wind turbine. The method also includes operating the wind turbine with at least one operational constraint being activated. Further, the method includes varying a tip speed ratio for the wind turbine while the at least one operational constraint is activated so as to maximize a power coefficient of the wind turbine.

14 Claims, 8 Drawing Sheets

(56) References Cited

U.S. PATENT DOCUMENTS

| | | |
|---|---|---|
| 8,858,174 B2 | 10/2014 | Lee et al. |
| 2004/0197186 A1 | 10/2004 | Wobben |
| 2004/0201220 A1 | 10/2004 | Andersen et al. |
| 2009/0220340 A1* | 9/2009 | Pierce ................... F03D 7/0272 416/36 |
| 2010/0098540 A1 | 4/2010 | Frick et al. |
| 2013/0166082 A1 | 6/2013 | Ambekar et al. |
| 2013/0187383 A1 | 7/2013 | Esbensen et al. |
| 2015/0152847 A1 | 6/2015 | Guadayol Roig |
| 2015/0308416 A1* | 10/2015 | Ambekar ................ F03D 17/00 700/287 |
| 2016/0265509 A1 | 9/2016 | Movsichoff |
| 2017/0241405 A1* | 8/2017 | Kruger ................ G05B 19/048 |

OTHER PUBLICATIONS

Gonzalez, Javier Serrano et al., "Optimum Wind Turbines Operation for Minimizing Wake Effect Losses in Offshore Wind Farms," International Conference on Environment and Electrical Engineering (EEEIC), IEEE, Nov. 1, 2013 (Nov. 1, 2013), pp. 188-192.
European Search Report for EP Application No. 18810220.6, dated Feb. 2, 2021.

* cited by examiner

SYSTEM AND METHOD FOR OPTIMIZING POWER OUTPUT OF A WIND TURBINE DURING AN OPERATIONAL CONSTRAINT

FIELD

The present disclosure relates generally to wind turbines, and more particularly to systems and methods for optimizing power output, reducing loads, and/or lowering noise during an operational constraint of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. In particular, the rotor blades experience significant loading, and frequent changes in loading, during operation due to interaction with the wind. Changes in wind speed and direction, for example, may modify the loads experienced by the rotor blades. To reduce rotor blade loading, various control systems have been developed to allow the rotor blades to shed a portion of the loads experienced thereby. Such control systems include, for example, pitching the rotor blades and/or modifying generator torque during operation. In a variable rotor speed operational mode of the wind turbine, the control system can be designed to regulate the rotor speed so as to follow a defined Tip Speed Ratio (TSR) set point (through generator torque regulation), and maintain the pitch angle at a defined pitch set point. Further, TSR regulation can be based on measured TSR or estimated TSR.

Thus, modern wind turbines operate according to one or more set points designed to achieve maximum power while also maintaining loads within safe limits. In particular, many wind turbine control schemes implement one or more operational constraints in order to achieve a trade-off between loads and power performance. For example, one such operational constraint is a thrust constraint that involves reducing loads when an estimated thrust value exceeds a pre-defined thrust limit.

The power coefficient (generally referred to as $C_p$) of a wind turbine is the measure of wind turbine aerodynamic efficiency and is the ratio of actual mechanical power produced by the wind turbine divided by the total power available in the wind flowing through the rotor at a specific wind speed. In certain instances, the power coefficient can be predicted from aerodynamic performance maps, which are dimensional or non-dimensional tables or graphs that describe rotor loading and performance (e.g. power, thrust, torque, bending moment, or similar) under given conditions (e.g. density, wind speed, rotor speed, pitch angles, or similar). As such, the aerodynamic performance map(s) may include: power coefficients, thrust coefficients, torque coefficients, and/or partial derivatives with respect to pitch angle, rotor speed, or tip speed ratio (TSR). Alternatively, the aerodynamic performance maps can be dimensional power, thrust, and/or torque values instead of coefficients.

For example, the aerodynamic performance maps may include a look-up table of the power coefficient as a function of pitch angle and TSR of the wind turbine. In other words, for normal wind turbine operation, the operational constraints are converted to aerodynamic coefficient values such that the optimal operating set point (e.g. the power coefficient) that satisfies all of the constraints and also maximizes power can be chosen from the aerodynamic performance map. The turbine controller can use the resulting optimal TSR and pitch set points obtained from the map to control the wind turbine. Generally, the TSR set point is a fixed value to which turbine is regulated during variable rotor speed operation of the wind turbine. When the operational constraint(s) are implemented by the turbine controller, the power coefficient decreases since a fixed TSR set point cannot be optimal across a range of operational constraints.

Accordingly, the present disclosure is directed to systems and methods for varying the TSR set point during such operational constraints so as optimize power, reduce loads, and/or lower acoustic noise emission from the wind turbine.

BRIEF DESCRIPTION

Aspects and advantages of the invention will be set forth in part in the following description, or may be obvious from the description, or may be learned through practice of the invention.

In one aspect, the present disclosure is directed to a method for optimizing power production of a wind turbine. The method includes determining at least one operational constraint for the wind turbine. The method also includes operating the wind turbine with at least one operational constraint being activated. Further, the method includes varying a tip speed ratio for the wind turbine while the at least one operational constraint is activated so as to maximize a power coefficient of the wind turbine.

In one embodiment, the operational constraint(s) may include a thrust constraint, a rotor/generator speed constraint, a torque constraint, a noise constraint, and/or an external set point, for example, from a farm wake management control scheme. In another embodiment, the operational constraint(s) may impose an operational limit on the wind turbine. For example, the operational limit may include a predetermined maximum thrust, a predetermined maximum speed, a predetermined maximum torque, a predetermined maximum noise limit, and/or a tip speed ratio set point received from an external source.

In further embodiments, when the at least one operational constraint is activated, the method may include determining an acoustic noise emission of the wind turbine, and if a limiting value is reached, decreasing the tip speed ratio, sometimes along with an increase in blade pitch angles.

In several embodiments, the step of varying the tip speed ratio for the wind turbine while the at least one operational constraint is activated may include reducing the tip speed ratio when the predetermined maximum thrust is reached. In addition, the method may include increasing a pitch angle of at least one rotor blade of the wind turbine in addition to reducing the tip speed ratio.

In another embodiment, the method may include monitoring one or more turbine operating conditions or wind conditions of the wind turbine when the at least one operational constraint is activated, determining an estimated thrust value of the wind turbine based on the one or more turbine operating conditions or wind conditions, and varying the tip speed ratio for the wind turbine if the estimated thrust value is greater than or equal to the predetermined maximum thrust.

In additional embodiments, when the operational constraint(s) is activated, the method may further include monitoring a torque of the wind turbine. More specifically, during monitoring, if a rated torque value is reached, the method may include increasing the tip speed ratio. In addition, the method may include increasing a pitch angle of at least one rotor blade of the wind turbine in addition to increasing the tip speed ratio.

In particular embodiments, the method may also include operating the wind turbine with a plurality of operational constraints being activated. For example, in one embodiment, when the wake management control scheme and the thrust constraint are both activated, the method may include selecting the tip speed ratio based on a minimum tip speed ratio value between the wake management control scheme and the thrust constraint.

In certain embodiments, the method may further include restoring the tip speed ratio when the at least one operational constraint is deactivated.

In another aspect, the present disclosure is directed to a system for optimizing power production of a wind turbine. The system includes a turbine controller having one or more processors configured to perform one or more operations, including but not limited to, determining at least one operational constraint for the wind turbine, operating the wind turbine with at least one operational constraint being activated, and varying a tip speed ratio for the wind turbine while the at least one operational constraint is activated so as to maximize a power coefficient of the wind turbine.

In yet another aspect, the present disclosure is directed to a wind turbine. The wind turbine includes a tower, a nacelle mounted on the tower, a rotor coupled to the nacelle, and a turbine controller. The rotor includes a rotatable hub having a plurality of rotor blades mounted thereto. The turbine controller includes at least one processor configured to perform one or more operations, including but not limited to, determining at least one operational constraint for the wind turbine, operating the wind turbine with at least one operational constraint being activated, and varying a tip speed ratio for the wind turbine while the at least one operational constraint is activated so as to maximize a power coefficient of the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
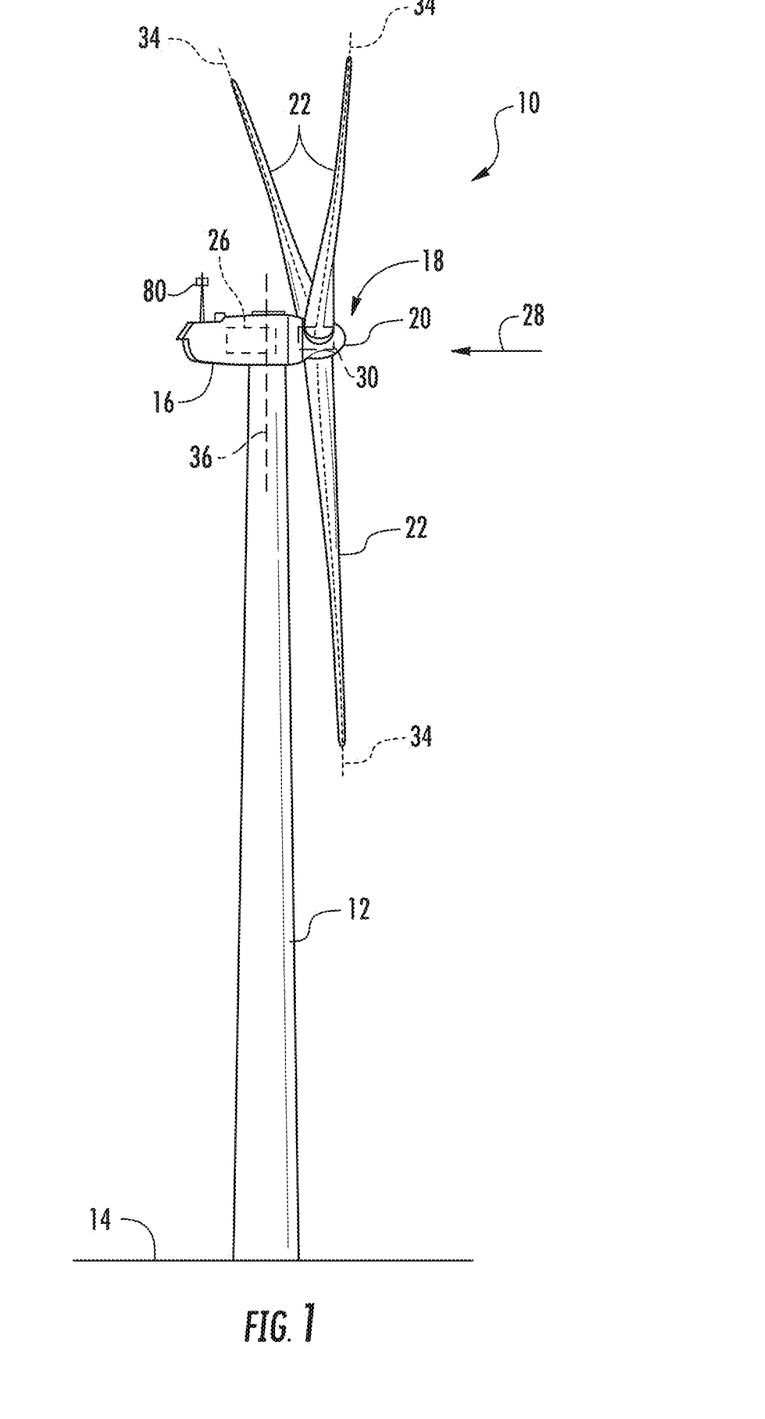
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
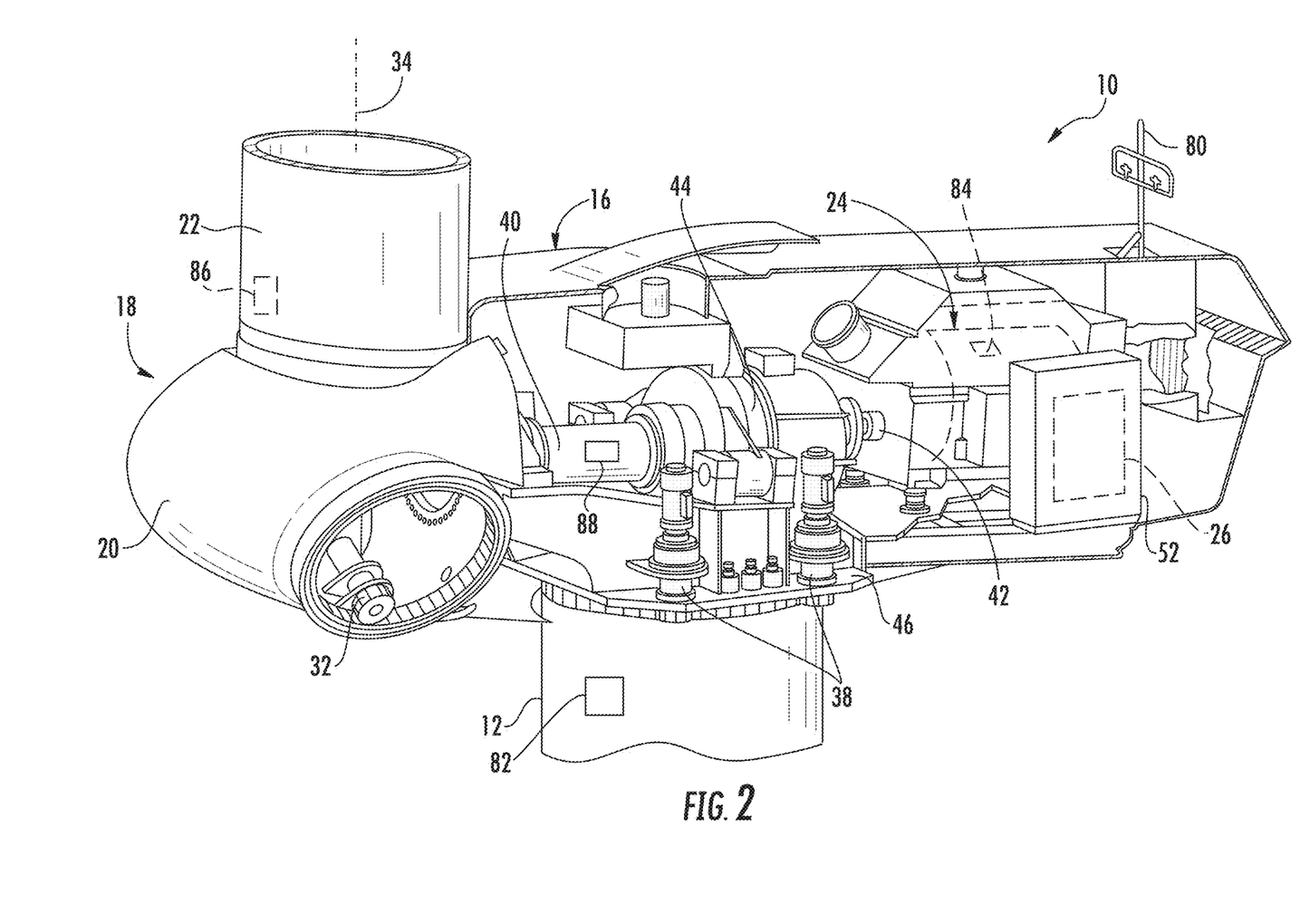
FIG. 2 illustrates a perspective, internal view of one embodiment of a nacelle of a wind turbine according to the present disclosure.

Referring now to FIG. 2, a simplified, internal view of one embodiment of the nacelle 16 of the wind turbine 10 is illustrated. As shown, the generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40.

Alternatively, the generator 24 may be directly rotatably coupled to the rotor shaft 40 (often referred to as a "direct-drive wind turbine").

It should be appreciated that the rotor shaft 40 may generally be supported within the nacelle 16 by a support frame or bedplate 46 positioned atop the wind turbine tower 12. For example, the rotor shaft 40 may be supported by the bedplate 46 via a pair of pillow blocks mounted to the bedplate 46.

Additionally, as shown, the wind turbine 10 may also include a turbine control system or a turbine controller 26 located within the nacelle 16. For example, as shown in the illustrated embodiment, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. Moreover, as described herein, the turbine controller 26 may also be communicatively coupled to various components of the wind turbine 10 for generally controlling the wind turbine and/or such components, as well as the various operating modes (e.g., start-up or shut-down sequences) of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 (FIG. 1) of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Still further, the turbine controller 26 may be configured to control the torque of the generator 24. For example, the turbine controller 26 may be configured to transmit control signals/commands to the generator 24 in order to modulate the magnetic flux produced within the generator 24, thus adjusting the torque demand or set point of the generator 24. Such temporary de-rating of the generator 24 may reduce the rotational speed of the rotor blades 22, thereby reducing the aerodynamic loads acting on the blades 22 and the reaction loads on various other wind turbine 10 components.

Figure 3:
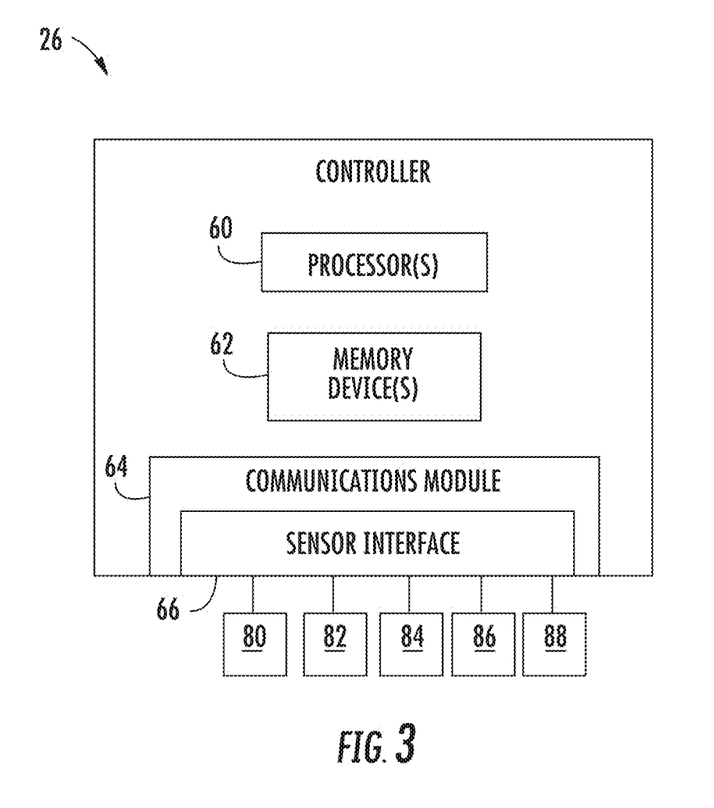
FIG. 3 illustrates a schematic diagram of one embodiment of suitable components that may be included within a controller of a wind turbine according to the present disclosure.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller 26 may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

The present disclosure is further directed to methods for optimizing power production of the wind turbine 10, e.g. when one or more operational constraints are implemented by the turbine controller 26. In particular, the controller 26 may be utilized to perform such methods. Thus, as shown in FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensor, to be converted into signals that can be understood and processed by the processor(s) 60.

Figure 4:
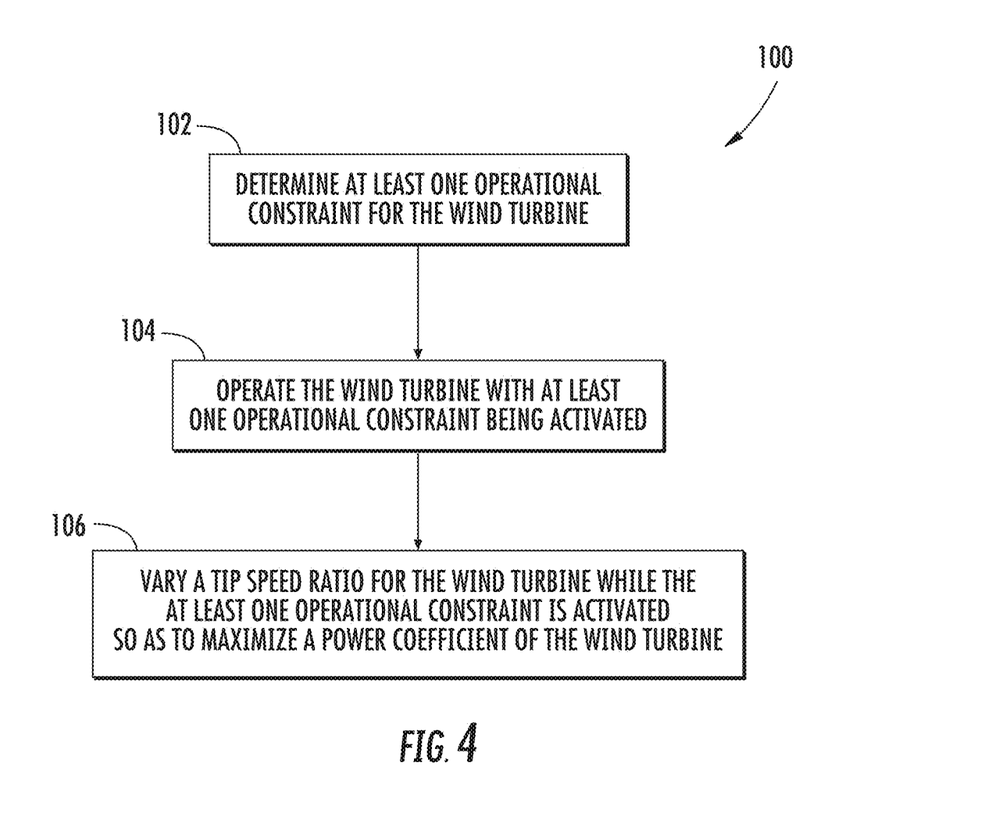
FIG. 4 illustrates a flow diagram of one embodiment of a method for optimizing power production of a wind turbine according to the present disclosure.

Referring now to FIG. 4, a flow diagram of one embodiment of a method 100 for optimizing power production of the wind turbine 10 when one or more operational constraints are implemented by the turbine controller 26 is illustrated. More specifically, as shown at 102, the method 100 includes determining at least one operational constraint for the wind turbine 10. As shown at 104, the method 100 includes operating the wind turbine 10 with the operational constraint(s) being activated. In one embodiment, for example, the operational constraint(s) may include a thrust constraint, a speed constraint, a torque constraint, a noise constraint, and/or a wake management control scheme. Such constraints can be measured with physical sensors or estimated. For example, in certain embodiments, the constraints may be estimated using available turbine sensor measurements and/or dynamic models using prediction or estimation techniques. As such, measured or predicted/estimated signals may be compared to threshold values (defined as operational parameters) to determine if constraints are active. In addition, the method 100 may include defining the constraint using the aerodynamic performance maps in the TSR/pitch angle space for prevailing measured or estimated wind conditions, which allows the method to define an optimal TSR and pitch set point to maximize the power coefficient while satisfying the constraint.

In further embodiments, the method 100 may include operating the wind turbine 10 with a plurality of operational constraints being activated. For example, in one embodiment, the wind turbine 10 may be operated with both the wake management control scheme and the thrust constraint activated. Thus, in certain embodiments, the operational constraint(s) may impose an operational limit on the wind turbine 10. For example, methods according to the present disclosure may in some embodiments further include establishing a maximum thrust, a maximum generator speed, a maximum torque, and/or a predetermined maximum noise limit. In exemplary embodiments, the maximum torque is a maximum generator torque, although in alternative embodiments a maximum aerodynamic torque could be established and the maximum generator torque established through calculation therefrom. Such maximum values are generally pre-established values or ratings which it is generally desirably are not exceeded during operation of the wind turbine 10.

Thus, as shown at 106, the method 100 further includes varying a tip speed ratio (TSR) for the wind turbine 10 while the operational constraint(s) is activated so as to maximize a power coefficient of the wind turbine 10. For example, in several embodiments, the controller 26 may be configured to reduce the TSR when the predetermined maximum thrust is reached. In addition, the controller 26 may be configured to increase a pitch angle of at least one rotor blade 22 of the wind turbine 10 in addition to reducing the TSR. As used herein, the tip speed ratio or TSR generally refers to the ratio between the tangential speed of the tip of one of the rotor blades 22 and the actual wind speed. Thus, the TSR may generally be calculated by multiplying the current rotational speed of the wind turbine 10 (such as the rotor 18 thereof) (measured by suitable sensors in the wind turbine 10) by the maximum radius of the rotor 18, and dividing this result by the wind speed. As such, to reduce the TSR as described herein, the controller 26 may reduce the turbine speed (i.e. the rotor speed or the generator speed). Accordingly, in such embodiments, the present disclosure is configured to increase power output of the wind turbine 10 without increasing the noise generated by the turbine 10 (which is a function of turbine speed).

Figure 5:
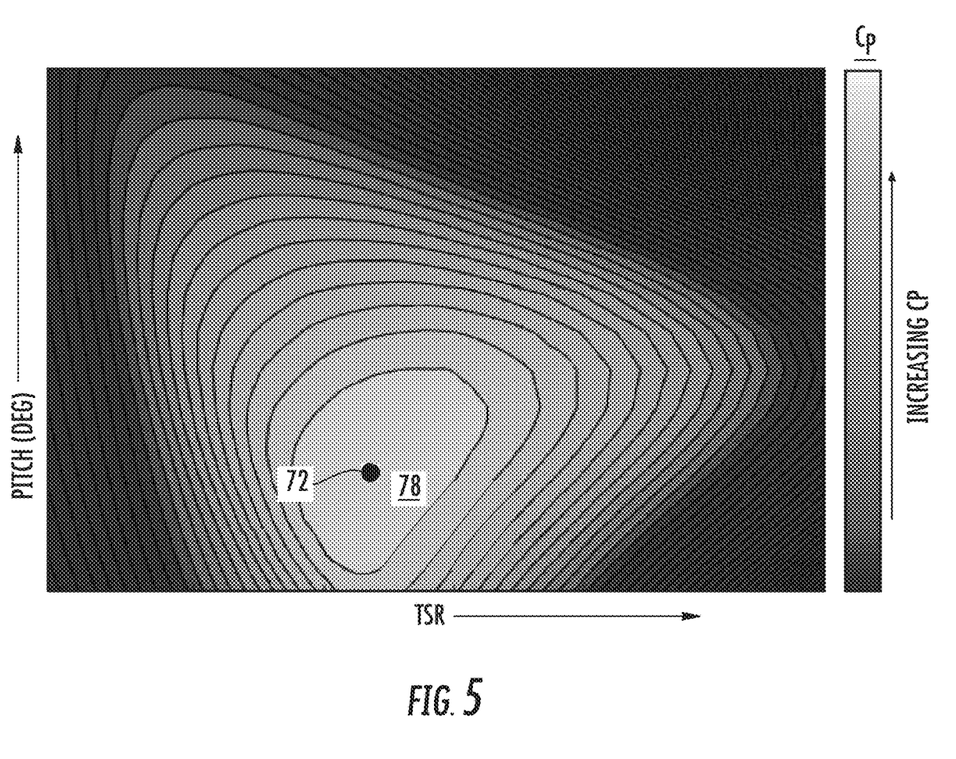
FIG. 5 illustrates one embodiment of an aerodynamic performance map depicting normal unconstrained wind turbine operation.
Figure 6:
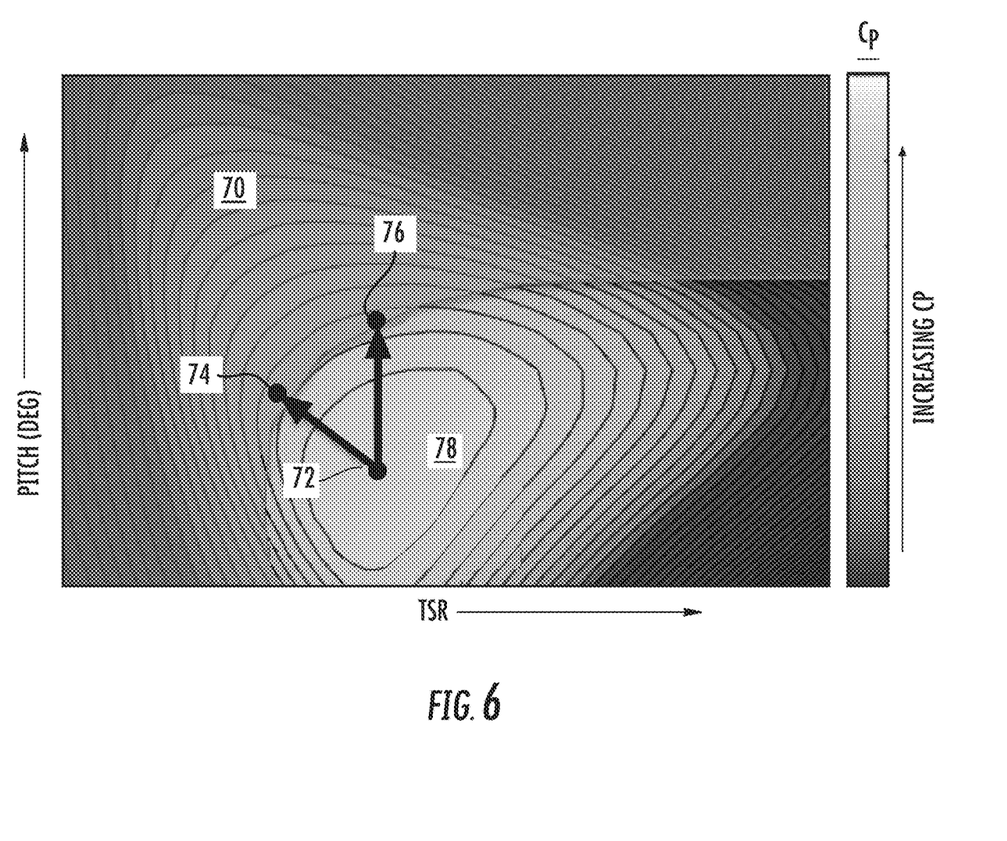
FIG. 6 illustrates one embodiment of an aerodynamic performance map depicting wind turbine operation under a thrust constraint.
Figure 7:
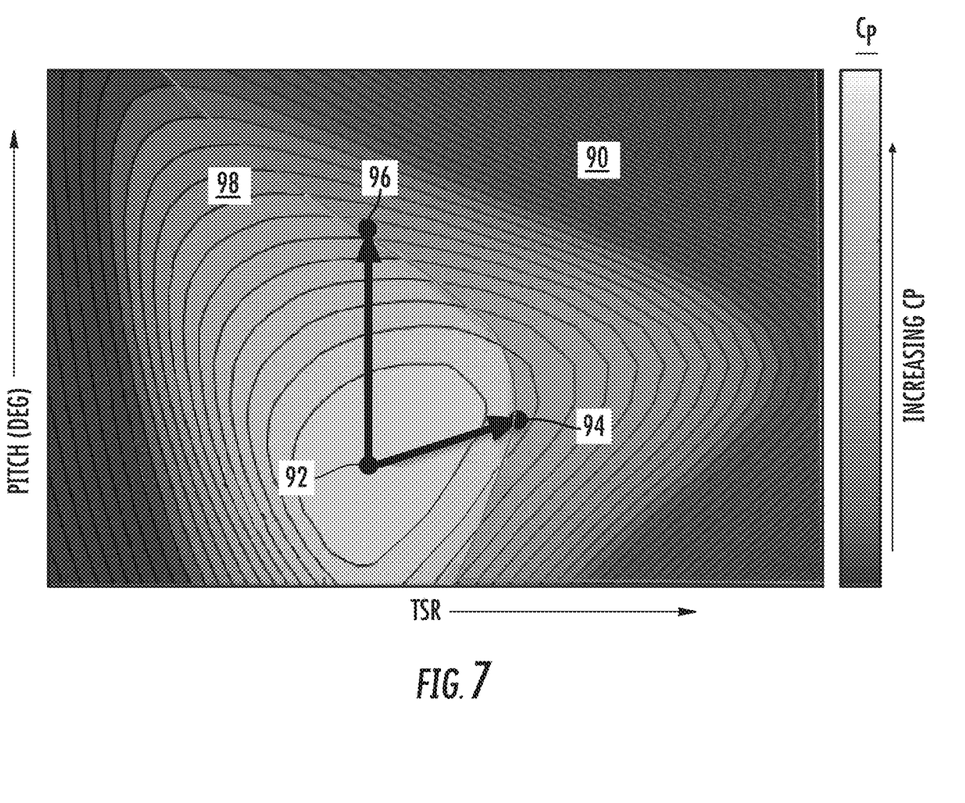
FIG. 7 illustrates one embodiment of an aerodynamic performance map depicting wind turbine operation under a torque constraint.

Referring now to FIGS. 5-7, various graphs (also generally referred to as aerodynamic performance maps) are provided to illustrate advantages of the present disclosure. More specifically, FIG. 5 illustrates one embodiment of an aerodynamic performance map according to normal or unconstrained wind turbine operation. FIGS. 6 and 7 illustrate various aerodynamic performance maps according to constrained wind turbine operation. As shown particularly in FIG. 5, the unconstrained optimal operating set point 72 corresponds to the optimal operational set point for the wind turbine 10 without any constraints in place. Further, as shown, the optimal operation set point 72 is chosen to maximize power performance of the wind turbine 10.

Referring particularly to FIGS. 6 and 7, various constraints have been implemented by the turbine controller 26 to further illustrate advantages of the present disclosure. More specifically, FIG. 6 illustrates a thrust constraint implemented by the turbine controller 26, as indicated by region 70. Similarly, as shown in FIG. 7, a torque constraint has been implemented by the turbine controller 26, as indicated by region 90. In other words, for both maps, the wind turbine 10 is limited to operation within regions 70 and 90, respectively, and cannot operate with regions 78, 98. As such, the controller 26 must select new operating points within regions 70 and 90. For example, operating points 76, 96 represent conventional wind turbine control schemes that utilize a fixed TSR during times of operational constraint(s). More specifically, as shown in FIG. 6, for thrust constraints, conventional control systems increase pitch and maintain the TSR at a fixed value to obtain a new power coefficient $C_p$. Similarly, as shown in FIG. 7, for torque constraints, conventional control systems also increase pitch and maintain the TSR at a fixed value to obtain a new power coefficient $C_p$.

In contrast, as shown by operating points 74, 94, the control methodology of the present disclosure varies the TSR during times of operational constraint(s) so as to maximize the power coefficient of the wind turbine 10. More specifically, as shown in FIG. 6, for thrust constraints, the turbine controller 26 of the present disclosure may increase pitch and reduce the TSR to obtain a new power coefficient $C_p$ as shown at 74 that is higher than the power coefficient $C_p$ for conventional control schemes. In addition, as shown in FIG. 7, for torque constraints, the turbine controller 26 of the present disclosure is configured to increase TSR to obtain a new power coefficient $C_p$ as shown at 94 that is also higher than the power coefficient $C_p$ for conventional control schemes.

More specifically, in certain embodiments, when the operational constraint(s) is activated, the controller 26 may also monitor a torque of the wind turbine 10. As such, during monitoring, if a rated torque value is reached, the controller 26 is configured to increase the TSR to a maximum value. In addition, as shown in FIG. 7, the controller 26 may increase a pitch angle of one or more of the rotor blades 22 of the wind turbine 10 in addition to increasing the TSR.

As mentioned, multiple constraints may be implements by the turbine controller 26 at the same time. In such instances, the controller 26 may vary the TSR as a function of both of the constraints. For example, in one embodiment, when the wake management control scheme and the thrust constraint are both activated, the controller 26 may modify the TSR based on a minimum TSR value between the wake management control scheme and the thrust constraint.

In addition, in certain embodiments, the turbine controller 26 may monitor one or more turbine operating conditions and/or wind conditions of the wind turbine 10, e.g. when the operational constraint(s) is activated. For example, the turbine operating conditions and/or wind conditions may be measured, such as through use of various suitable sensors. More specifically, suitable wind sensors 80 (FIG. 2) may include, for example, Light Detection and Ranging ("LIDAR") devices, Sonic Detection and Ranging ("SODAR") devices, anemometers, wind vanes, barometers, and radar devices (such as Doppler radar devices). In further embodiments, the turbine operating conditions may include tower sensors 82, generator sensors 84, main shaft sensors 88, and/or blade sensors 86. Still further, any suitable measurement devices may be utilized to directly or indirectly measure the turbine operating conditions and/or wind conditions of the wind turbine 10. As such, in certain embodiments, the controller 26 is further configured to determine an estimated thrust value of the wind turbine 10 based on the turbine operating condition(s) and/or the wind conditions. Thus, the controller 26 may vary the TSR for the wind turbine 10 if the estimated thrust value is greater than or equal to the predetermined maximum thrust. Such a control scheme may further be provided for any of the constraints described herein.

In additional embodiments, the turbine controller 26 may also be configured to restore (e.g. increase) the TSR when the operational constraint(s) (e.g. the thrust constraint) is deactivated so as to resume normal operation and maximize the power coefficient.

Figure 8:
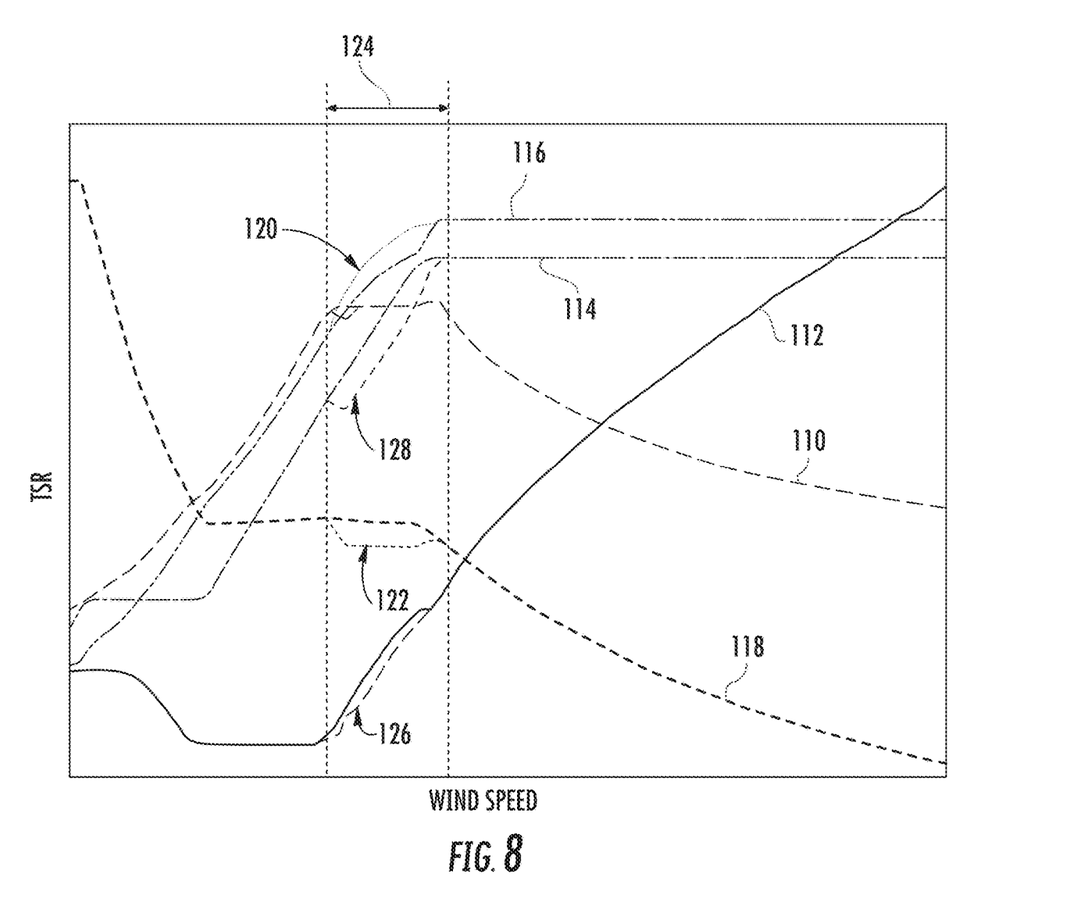
FIG. 8 illustrates a plot of one embodiment of tip speed ratio versus wind speed according to the present disclosure.

Referring now to FIG. 8, one embodiment of a plot of tip speed ratio versus wind speed according to the present disclosure is illustrated. More specifically, as shown, the plot illustrates thrust 110, pitch angle 112, generator speed 114, generator torque 116 as a function of varying TSR 118 and wind speed. Further, as shown at 120, the plot illustrates an increase in torque 116 due to a lower TSR. Moreover, the plot illustrates a reduced TSR, as shown at 122, in the thrust control region 124. In addition, in the thrust control region 124, the plot illustrates a decrease 126 in pitch compared to the baseline pitch 112 as well as a decrease 128 in generator speed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing power production of a wind turbine, the method comprising:
   providing at least one aerodynamic performance map for the wind turbine, the at least one aerodynamic performance map being a table or graph that provides relationships of loading and the power production under given conditions, the given conditions comprising at least one of air density, wind speed, rotor speed, or pitch angle;
   determining, via a controller of the wind turbine, a load constraint for the wind turbine that is indicative of rotor thrust;
   operating, via the controller, the wind turbine with the load constraint being activated, wherein the load constraint imposes a predetermined maximum thrust limit on the wind turbine such that operation of the wind turbine is constrained to a limited region of the at least one aerodynamic performance map; and,
   varying, via the controller, a tip speed ratio for the wind turbine from a baseline tip speed ratio while the load constraint is activated so as to maximize a power coefficient of the wind turbine within the limited region of the at least one aerodynamic performance map.

2. The method of claim 1, wherein, when the load constraint is activated, the method further comprises:
   determining an acoustic noise emission of the wind turbine; and,
   if a limiting value is reached, reducing the tip speed ratio.

3. The method of claim 1, wherein varying the tip speed ratio for the wind turbine while the load constraint is activated further comprises reducing the tip speed ratio when the predetermined maximum thrust limit is reached.

4. The method of claim 3, further comprising increasing a pitch angle of at least one rotor blade of the wind turbine in addition to reducing the tip speed ratio.

5. The method of claim 1, further comprising:
   monitoring one or more turbine operating conditions or wind conditions of the wind turbine when the load constraint is activated;
   determining an estimated thrust value of the wind turbine based on the one or more turbine operating conditions or wind conditions; and
   varying the tip speed ratio for the wind turbine if the estimated thrust value is greater than or equal to the predetermined maximum thrust limit.

6. The method of claim 1, wherein, when the load constraint is activated, the method further comprises monitoring a torque of the wind turbine, and if a rated torque value is reached, increasing the tip speed ratio.

7. The method of claim 6, further comprising increasing a pitch angle of at least one rotor blade of the wind turbine in addition to increasing the tip speed ratio.

8. The method of claim 1, further comprising operating the wind turbine with a plurality of additional operational constraints being activated.

9. The method of claim 1, further comprising restoring the tip speed ratio to the baseline tip speed ratio when the load constraint is deactivated.

10. A system for optimizing power production of a wind turbine, the system comprising:
    a turbine controller comprising one or more processors configured to perform one or more operations, the one or more operations comprising:
    providing at least one aerodynamic performance map for the wind turbine, the at least one aerodynamic performance map being a table or graph that provides relationships of loading and the power production under given conditions, the given conditions comprising at least one of air density, wind speed, rotor speed, or pitch angle;
    determining a load constraint for the wind turbine;
    operating the wind turbine with the load constraint being activated, wherein the load constraint imposes a predetermined maximum thrust limit on the wind turbine such that operation of the wind turbine is constrained to a limited region of the at least one aerodynamic performance map; and,
    varying a tip speed ratio for the wind turbine while the load constraint is activated so as to maximize a power coefficient of the wind turbine within the limited region of the at least one aerodynamic performance map.

11. The system of claim 10, wherein varying the tip speed ratio for the wind turbine while the load constraint is activated further comprises reducing the tip speed ratio when the predetermined maximum thrust limit is reached.

12. The system of claim 10, wherein the one or more operations further comprise:
    monitoring one or more turbine operating conditions or wind conditions of the wind turbine when the load constraint is activated;

determining an estimated thrust value of the wind turbine based on the one or more turbine operating conditions or wind conditions; and varying the tip speed ratio for the wind turbine if the estimated thrust value is greater than or equal to the predetermined maximum thrust limit.

13. The system of claim 10, wherein, when the load constraint is activated, the one or more operations further comprise monitoring a torque of the wind turbine, and if a rated torque value is reached, increasing the tip speed ratio to a maximum value.

14. A wind turbine, comprising:
a tower;
a nacelle mounted on the tower;
a rotor coupled to the nacelle, the rotor comprising a rotatable hub having a plurality of rotor blades mounted thereto; and
a turbine controller comprising at least one processor configured to perform one or more operations, the one or more operations comprising:

providing at least one aerodynamic performance map for the wind turbine, the at least one aerodynamic performance map being a table or graph that provides relationships of loading and power production under given conditions, the given conditions comprising at least one of air density, wind speed, rotor speed, or pitch angle;

determining a load constraint for the wind turbine;

operating the wind turbine with the load constraint being activated, wherein the load constraint imposes a predetermined maximum thrust limit on the wind turbine such that operation of the wind turbine is constrained to a limited region of the at least one aerodynamic performance map; and, varying a tip speed ratio for the wind turbine while the load constraint is activated so as to maximize a power coefficient of the wind turbine within the limited region of the at least one aerodynamic performance map.

\* \* \* \* \*